United States Patent [19]

Sim

[11] Patent Number: 5,384,642
[45] Date of Patent: Jan. 24, 1995

[54] TRACKING AND PICTURE QUALITY IN A VTR

[75] Inventor: Sun-seon Sim, Suwon, Rep. of Korea

[73] Assignee: SamSung Electronics Co., Ltd., Suwon, Rep. of Korea

[21] Appl. No.: 824,221

[22] Filed: Jan. 22, 1992

[30] Foreign Application Priority Data

Feb. 2, 1991 [KR] Rep. of Korea ............... 91-1809
Feb. 13, 1991 [KR] Rep. of Korea ............... 91-2392

[51] Int. Cl.$^6$ ................................. H04N 5/76
[52] U.S. Cl. ............................ 358/336; 358/335
[58] Field of Search ............... 358/336, 314, 315, 327, 358/307, 341, 343, 316; 360/38.1, 19.1, 10.3, 10.2, 77.14, 77.15

[56] References Cited

U.S. PATENT DOCUMENTS

| | | | |
|---|---|---|---|
| 4,559,567 | 12/1985 | Maruichi | 360/10.3 |
| 4,623,994 | 11/1986 | Nabeshima et al. | 369/44 |
| 4,710,832 | 12/1987 | Itoh | 360/10.2 |
| 4,729,041 | 2/1988 | Kuroda | 358/336 |
| 4,734,793 | 3/1988 | Kaneko et al. | 358/336 |
| 4,835,758 | 5/1989 | Fujishima | 369/58 |
| 4,890,169 | 12/1989 | Kobayashi et al. | 360/10.3 |
| 4,931,888 | 6/1990 | Taguchi et al. | 360/77.04 |

Primary Examiner—Tommy P. Chin
Assistant Examiner—Robert Chevalier
Attorney, Agent, or Firm—Robert E. Bushnell

[57] ABSTRACT

A circuit for automatically compensating tracking and picture quality includes a microcomputer for controlling the overall system by performing a built-in program according to a key input, a servo circuit for performing servo function under the control of the microcomputer, a video processor for processing video signals during recording and playing, an audio processor for processing audio signals during recording and playing, and outputting the maximum value of an audio envelope to the microcomputer, a first picture compensator for changing a specific frequency characteristic gain of the video signal in the video processor under the control of the microcomputer, a second picture compensator for attenuating specific bandwidth noise of the video signal of the video processor under the control of the microcomputer, an envelope detector for detecting the video envelope signal from the video processor, and a drop-out compensating pulse buffer for buffering a drop-out compensating pulse from the video processor. The tracking is automatically controlled to be carried out at optimum position, thereby maintaining optimum picture and audio qualities.

23 Claims, 8 Drawing Sheets

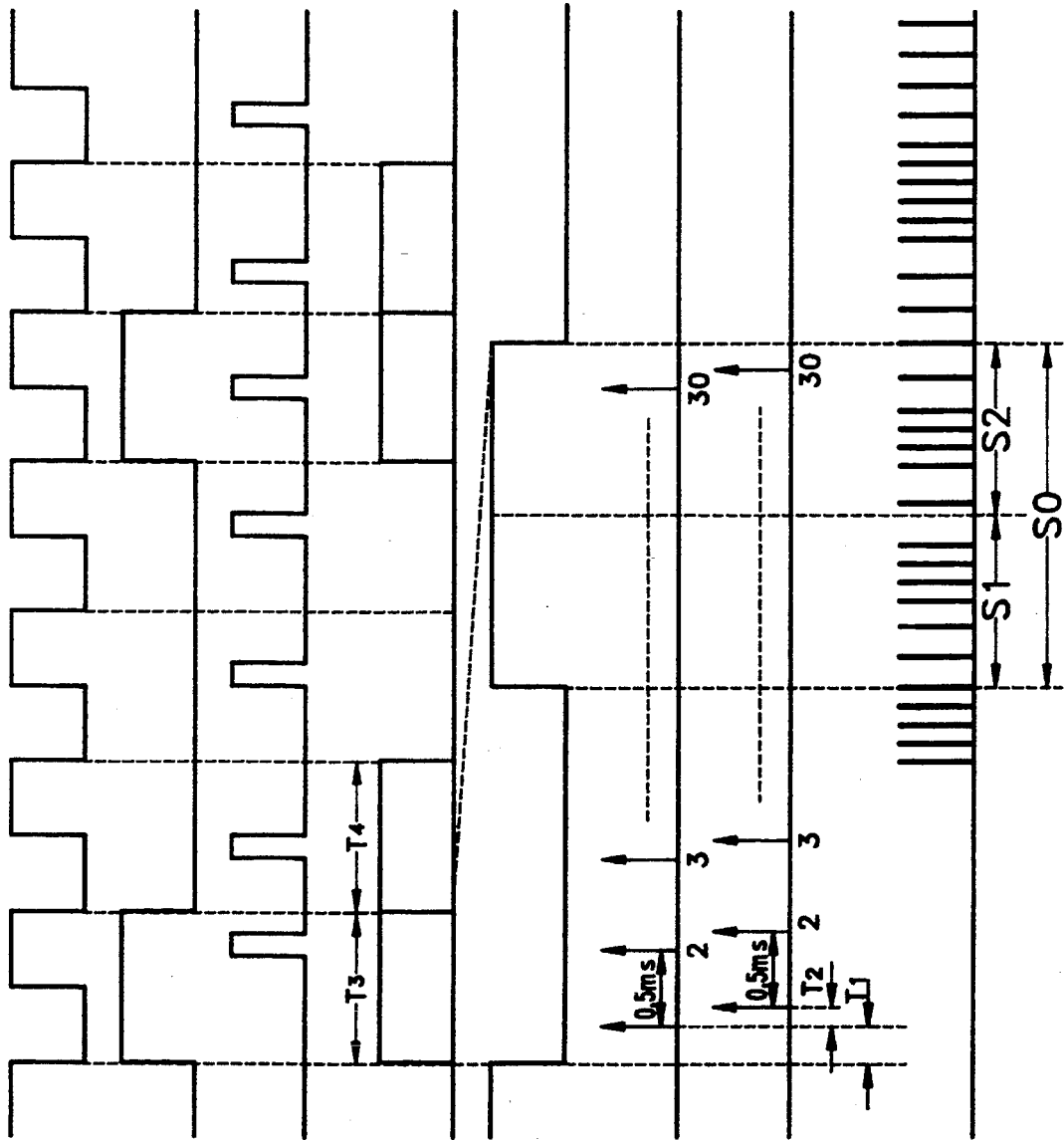

TRACKING AND PICTURE QUALITY IN A VTR

BACKGROUND OF THE INVENTION

The present invention relates to a circuit and method for automatically compensating tracking and picture quality of a video tape recorder (VTR), in which tracking and picture quality are automatically compensated during the playback of a tape in a VTR, thereby enabling the VTR to produce optimum picture quality.

While performing reproduction in a VTR, a video head should accurately trace the video track of a tape on which video signals are recorded. That is, the position of the rotary video head must be controlled so that it corresponds to the position of the tape on which the video signal is recorded. For this reason, a 30 Hz control signal generated from the vertical sync signal of the input video signal is recorded by a control head on the control track along the bottom of the tape. Thus, the control signal is reproduced during playback, and used as a reference signal for controlling the phase of the drum and servo system.

On the other hand, the spacing between the position of the control head, i.e., the X-distance, differs slightly in all VTRs. Therefore, since the X-distance of each VTR commercially available differs from one another during playback, the tracking positions also do not match, thereby causing noise in a video cassette tape.

To decrease such noise, the tracking is automatically or manually controlled. Manual tracking adjustment is performed by a user checking the condition of the picture while turning a tracking control knob installed on the VTR. Automatic tracking adjustment is performed via software within a microcomputer.

In the conventional tracking adjusting method, the envelope levels of the video signal picked up by the head are compared while decreasing or increasing the tracking data, so that tracking is controlled in optimum state when the envelope level is maximized.

Meanwhile, drop-out of the reproduced video signal is detected and compensated in the VTR. The drop-out detection is performed every one horizontal scanning period. When the drop-out is detected, a drop-out compensation (hereinafter referred to as DOC) pulse is generated, and then, the signal delayed by one horizontal scanning period is output in current signal period, so that the drop-out is compensated, which in turn decreases noise.

At this time, although the drop-out is compensated by the DOC pulse in accordance with the drop-out detection, good picture quality cannot be obtained when a plurality of DOC pulses are generated, i.e., in case of severe drop-out.

Accordingly, since the picture quality is controlled by only comparing the envelope levels of the video signal to adjust the tracking according to the conventional automatic adjusting method, a problem remains that the deterioration of picture quality due to drop-out cannot be prevented.

SUMMARY OF THE INVENTION

It is the object of the present invention to provide a circuit and a method for automatically compensating tracking and picture quality in a VTR, which can optimally maintain the picture quality by automatically adjusting the tracking using the envelope level of a video signal and a drop-out compensating pulse, and automatically compensate for the deterioration of picture quality caused by the drop-out.

To achieve the above and other objects of the present invention, there is provided a circuit for automatically compensating the tracking and picture quality of a VTR comprising:

a microcomputer for controlling the overall system by performing a built-in program in accordance with a key input, which receives a head switching pulse, a control pulse, video and audio envelope signal level, and a drop-out compensating pulse, and generating tracking data for controlling tracking and a control signal for compensating picture quality;

a servo circuit for performing a servo function under the control of the microcomputer, which controls the tracking in accordance with the tracking data, and supplies the head switching pulse and control pulse to the microcomputer by carrying out the servo function;

a video processor for processing video signals during recording and playback, which outputs the video envelope signal picked up by a video head and the drop-out compensating pulse in accordance with the detection of the drop-out compensating pulse;

an audio processor for processing audio signals during recording and playback, and outputting the maximum value of the audio envelope to the microcomputer;

a first picture compensator for supplying a gain signal to the video processor in order to change the frequency characteristic gain of the video signal in accordance with the picture quality compensating control signal of the microcomputer;

a second picture compensator operated by the picture quality compensating control signal of the microcomputer, for attenuating specific bandwidth noise of the video signal in the video processor;

an envelope detector for detecting the video envelope signal from the video processor, and supplying the envelope level to the microcomputer; and a drop-out compensating pulse buffer for buffering the drop-out compensating pulse output from the video processor, and supplying the buffered pulse to the microcomputer.

Also, to accomplish the object of the present invention, there is provided a method for automatically compensating the tracking and picture quality in a VTR comprising the steps of:

controlling the tracking which accumulatively calculates audio and video envelope signals by sampling them a predetermined number of times during one-head switching pulse generating period after outputting initial tracking data, and changes tracking data by detecting the magnitude of the envelope signals;

optimum point detecting for setting the peak point of a total envelope waveform as an optimum point, and outputting optimum tracking data;

drop-out compensating controlling which receives a drop-out compensating pulse, counts the input pulse during a predetermined period, minutely adjusts the controlled tracking to minimize the predetermined number of the drop-out compensating pulses, and demands a picture quality control output when the number of drop-out compensating pulses exceeds a predetermined number; and monitoring for detecting a control pulse, and controlling to repeat the tracking controlling step when control pulse is not successively detected more than the predetermined number of times, and otherwise when the audio and video envelopes exceed the minimum value, or the play mode is not released during change in the speed of a tape even though the audio and video envelopes are below minimum value.

BRIEF DESCRIPTION OF THE DRAWINGS

The object and features of the present invention will become more readily apparent from the following detailed description of the preferred embodiments taken in conjunction with the accompanying drawings in which:

FIGS. 4A through 4B are waveforms showing respective output signals of the circuit according to the present invention.

DETAILED DESCRIPTION OF THE INVENTION

Figure 1:
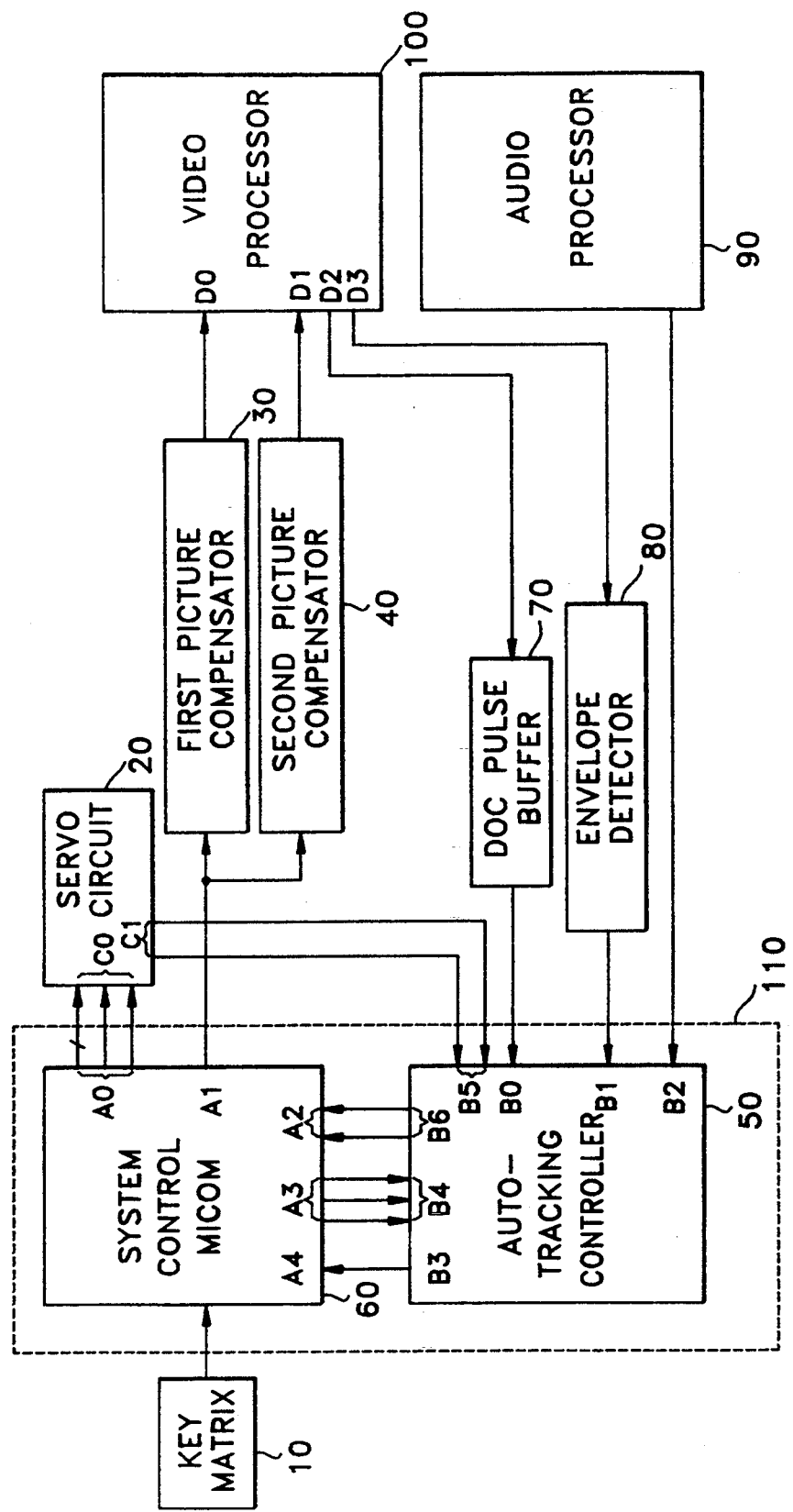
FIG. 1 is a block diagram showing a circuit for automatically compensating the tracking and picture quality of a VTR according to the present invention.

In FIG. 1, a circuit for automatically compensating the tracking and picture quality according to the present invention is composed of: a system control microcomputer 60 which controls the overall system by receiving a picture quality compensating demand output signal from an output B3 of an auto-tracking controller 50 through an input A4, and a tracking control demanding data input signal through an input A2 and performing the internal program; a servo circuit 20 which receives servo-controlling serial data including tracking data at an input C0 from an output A0 of system control microcomputer 60; an auto-tracking controller 50 which receives a head switching pulse and a control pulse from an output C1 of servo circuit 20 at an input B5, auto-tracking control signals from an output A3 of system control microcomputer 60 at an input B4, a DOC pulse from a DOC pulse buffer 70 at an input B0, a video envelope detecting signal from an envelope detector 80 at an input B1, and an audio envelope signal from an audio processor 90 at an input B2; a video processor 100 which receives a first picture quality compensating signal from a first picture compensator 30 at an input D0, and a second picture compensating signal from a second picture compensator 40 at an input D1; a DOC pulse buffer 70 for inputting the DOC pulse from an output D2 of video processor 100; an envelope detector 80 for receiving a video signal from an output D3 of video processor 100; and audio processor 90 for outputting the audio envelope signal. In the above-described construction, auto-tracking controller 50 can be included in system control system control microcomputer 60, thereby forming a microcomputer 110.

In the structure of FIG. 1, servo circuit 20 represents a block which carries out general servo functions in a VTR. Audio processor 90 represents a block which processes the audio during recording or playback in a VTR, and video processor 100 represents a block which processes the video during recording or playback in a VTR.

Figure 2:
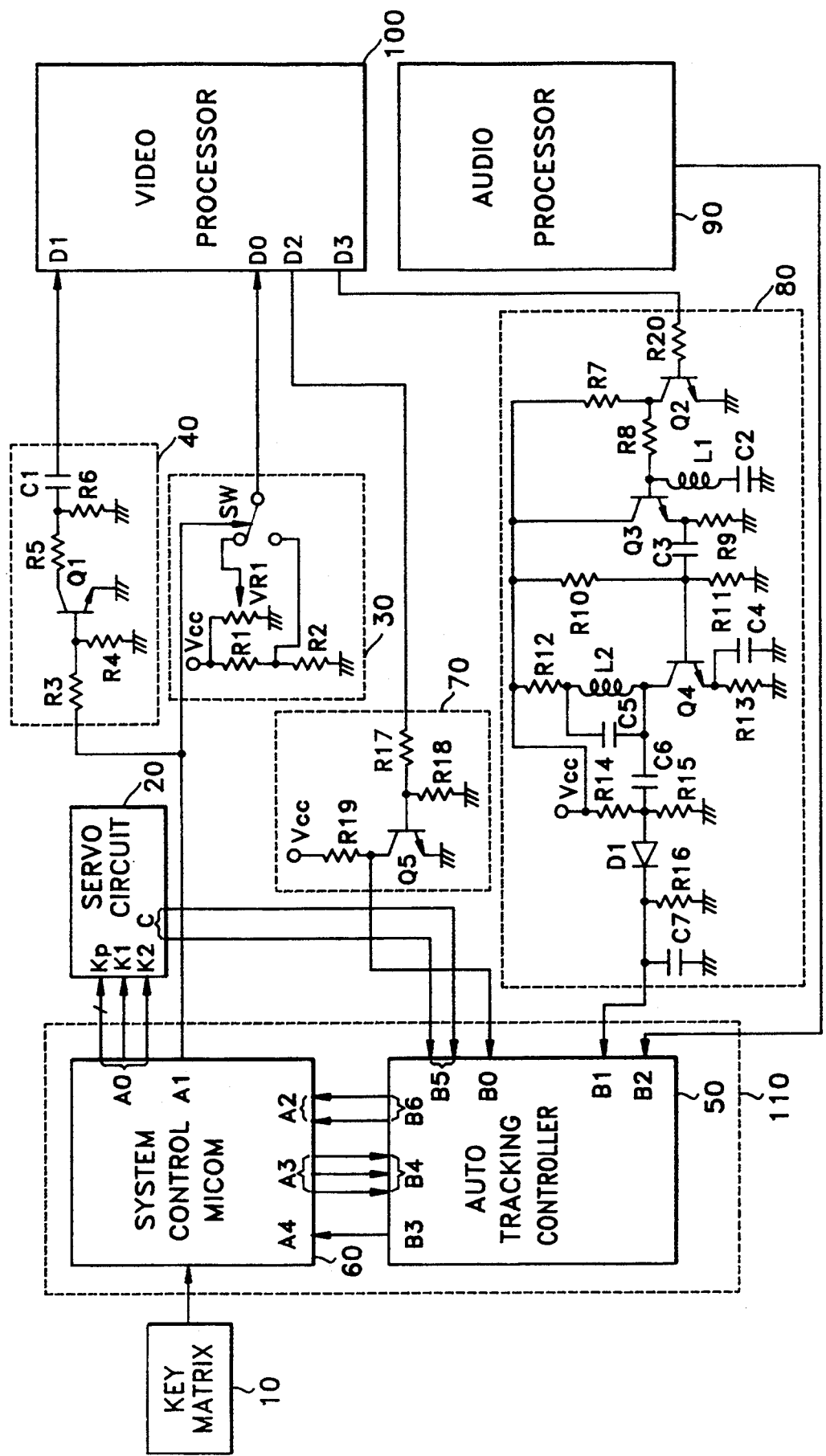
FIG. 2 is a circuit diagram showing an embodiment of the circuit for automatically compensating the tracking and picture quality of a VTR according to the present invention.

FIG. 2 illustrates a circuit diagram of an embodiment corresponding to the block diagram shown in FIG. 1.

In FIG. 2, first picture compensator 30 is composed of serially connected resistors R1 and R2 between a supply voltage Vcc and ground to divide supply voltage Vcc by a predetermined amount; a variable resistor VR1 also connected between supply voltage Vcc and ground, for varying supply voltage Vcc; and a switch SW which is switched by a picture quality compensating control signal of system control microcomputer 60, and then selectively outputs the divided voltage of resistors R1 and R2 or the varied voltage of variable resistor VR1 as a gain signal to video processor 100. Second picture compensator 40 is formed of a transistor Q1 driven by inputting the picture quality compensating control signal from system control microcomputer 60 to its base in accordance with the divided voltage of resistors R3 and R4, and resistors R5 and R6 and a capacitor C1 connected between the collector of transistor Q1 and video processor 100, functioning as a noise filter which, in accordance with the driving of transistor Q1, attenuates a specific band of the video signal in video processor 100. Envelope detector 80 consists of a transistor Q2 and a resistor R7 for receiving the video envelope signal of video processor 100 at the base of transistor Q2 via a resistor R20, and buffering it; a transistor Q3 for receiving the buffered video envelope signal from the collector of transistor Q2 via a resistor RS, and amplifying it; a transistor Q4 whose base is connected to the emitter of transistor Q3 via a capacitor C3; a resistor R9 connected between the emitter of transistor Q3 and ground; a coil L1 and a capacitor C2 serially connected between the base of transistor Q3 and ground; resistors R10 and R11 serially connected between power supply Vcc and ground, for dividing supply voltage Vcc to supply it to the base of transistor Q4; a capacitor C5 connected in parallel to coil L2; a resistor R12 and a coil L2 serially connected between supply voltage Vcc and the collector of transistor Q4; a resistor R13 and a capacitor C4 connected in parallel between the emitter of transistor Q4 and ground; resistors R14 and R15 serially connected between power supply Vcc and ground, for dividing power voltage Vcc; a diode D1 for receiving the amplified video envelope signal from the collector of transistor Q4 at its anode via a capacitor C6 and the common node between resistors R14 and R15, and detecting it; and a resistor R16 and a capacitor C7 connected in parallel between the cathode of diode D1 and ground. composed of a transistor Q5 driven by inputting the DOC pulse buffer 70 is; DOC pulse from video processor 100, which is divided by resistors R17 and R18. The collector of transistor Q5 is connected to supply voltage Vcc through a resistor R19, and its emitter is connected to ground.

FIGS. 3A through 3D constitute a flowchart for illustrating the operation of the present invention, which represents the automatic compensation function of the tracking and picture quality. Here, envelope level is detected while in the play mode, and the tracking is adjusted to maximize the envelope level, so that the number of DOC pulses present within a predetermined section is counted. The adjusted tracking is minutely controlled to minimize the number of DOC pulse again, and then, the picture quality compensating circuit is operated when the number of DOC pulse exceeds a predetermined number.

FIGS. 4A through 4G illustrate operational waveforms according to the present invention. Here, FIG.

4A is a head switching waveform; 4B is an audio or video sampling signal waveform; 4C is a tracking altering data waveform; 4D is a head switching pulse waveform of one period with respect to an envelope accumulating section; 4E is an audio sampling signal waveform; 4F is a video sampling signal waveform; and 4G is a DOC pulse generated for every detection of drop-out of the video signal.

Figure 5B:
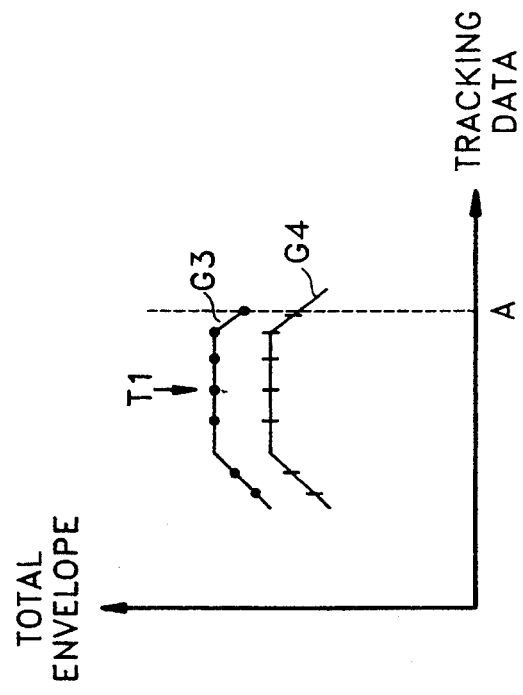
FIGS. 5A and 5B are graphs for determining the optimum tracking point according to the present invention.
Figure 5A:
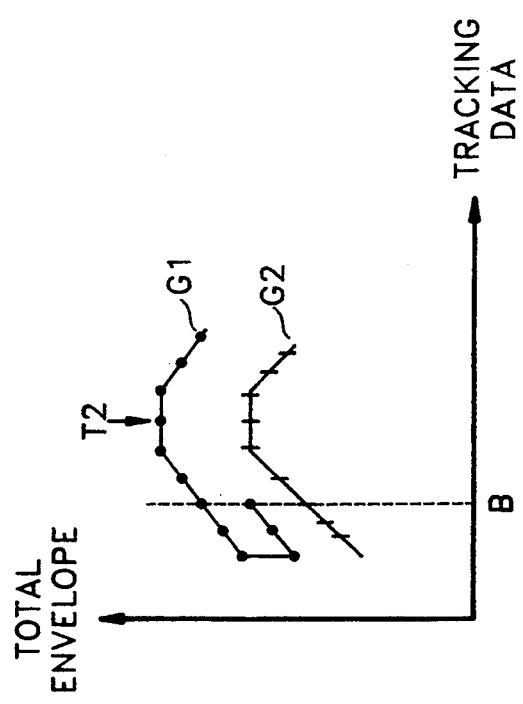

FIGS. 5a and 5B show graphs for determining the optimum point for tracking according to the present invention, which indicate the relationship between total envelope and tracking data.

Now, the operation according to an embodiment of the present invention will be described in detail with reference to the circuit diagram of FIG. 2, the flowchart of FIG. 3, and the timing diagram of FIG. 4.

Figure 3A:
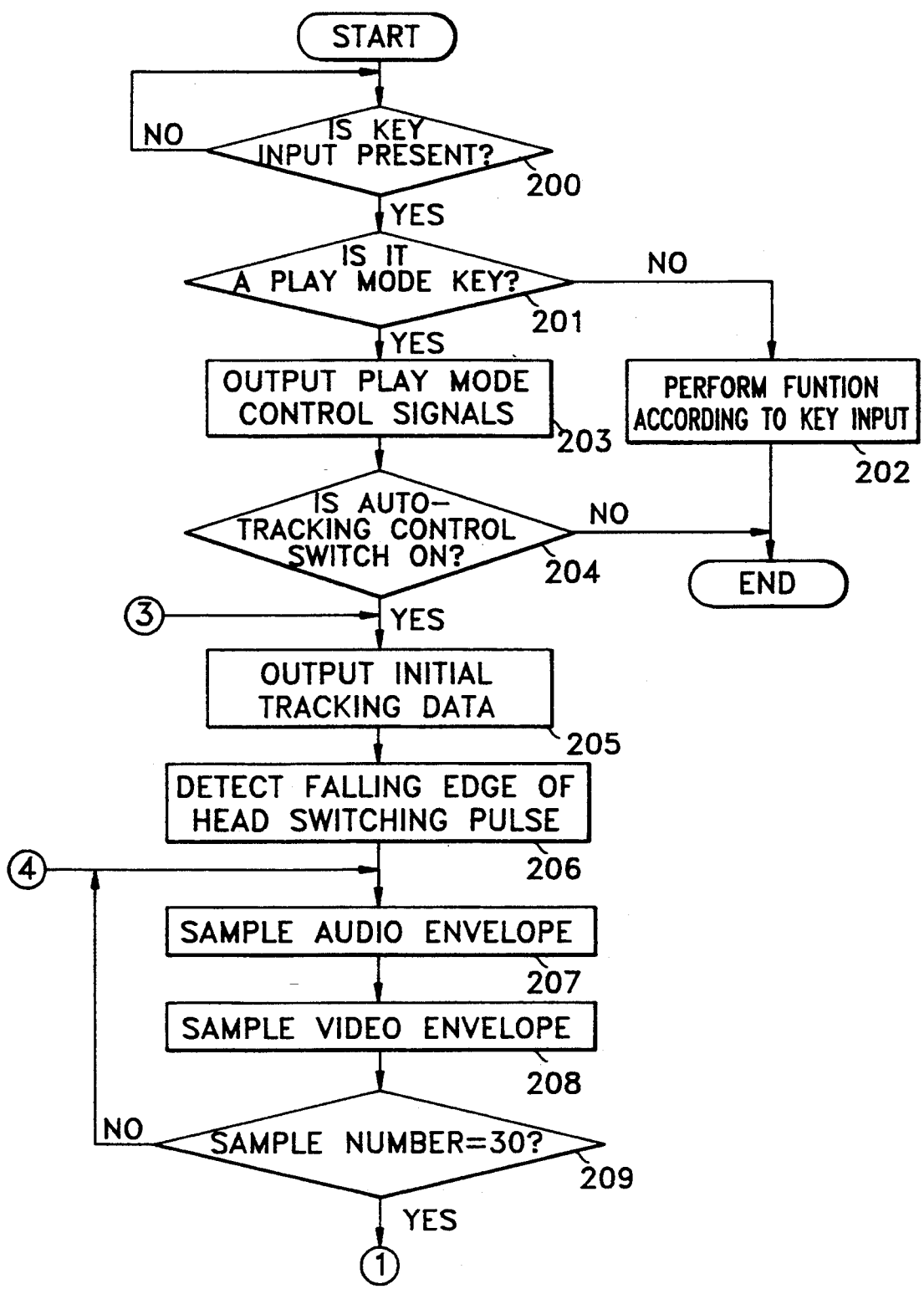
FIGS. 3A through 3D constitute a flowchart showing the operation of the present invention.

Referring to FIG. 3A, when the power is turned on, system control microcomputer 60 in FIG. 2 checks whether or not a key is input in step 200. If the key input by a user's manipulation of a key matrix 10 is not for the play mode in step 201, the function according to the key input is performed in step 202, and then, the program returns. Meanwhile, if the play mode key has been pressed, the playback operation begins which outputs a play mode control signal to each part of the system in step 203. Then, in step 204, the state of an auto-tracking control switch (not shown) is checked to determine whether it is on. Here, the auto-tracking control switch which is automatically or manually controlled by the user, and generally simply left on. In step 204, if the auto-tracking control switch is not on, the program returns, but otherwise executes step 205.

Initial tracking data of a digital tracking mode is output in step 205. After outputting the initial tracking data, the falling edge of the head switching pulse generated from servo circuit 20 is detected in step 206. Then, after a first predetermined period (a section $T_1$ in FIG. 4) of about 0.5 ms has elapsed, the sampling of the audio envelope output from audio processor 90 is carried out in step 207. The audio (or video) envelope represents the audio (or video) signal which is detected from a tape, frequency-modulated, and then digitized to be used in the microcomputer. After a second predetermined period (a section $T_2$ in FIG. 4) of about 0.25 ms has elapsed, the sampling of the video envelope is carried out in step 208. In step 209, the number of samplings of both the audio and video signals are checked to determine whether or not sampling has been performed 30 times. The sampling repeats at intervals of 0.5 ms until the sampling of each audio signal and video signal numbers 30. Here, thirty is selected as the sampling number, so that sampling is carried out within one-head switching pulse period, and one sampling period is four frames.

Figure 3B:
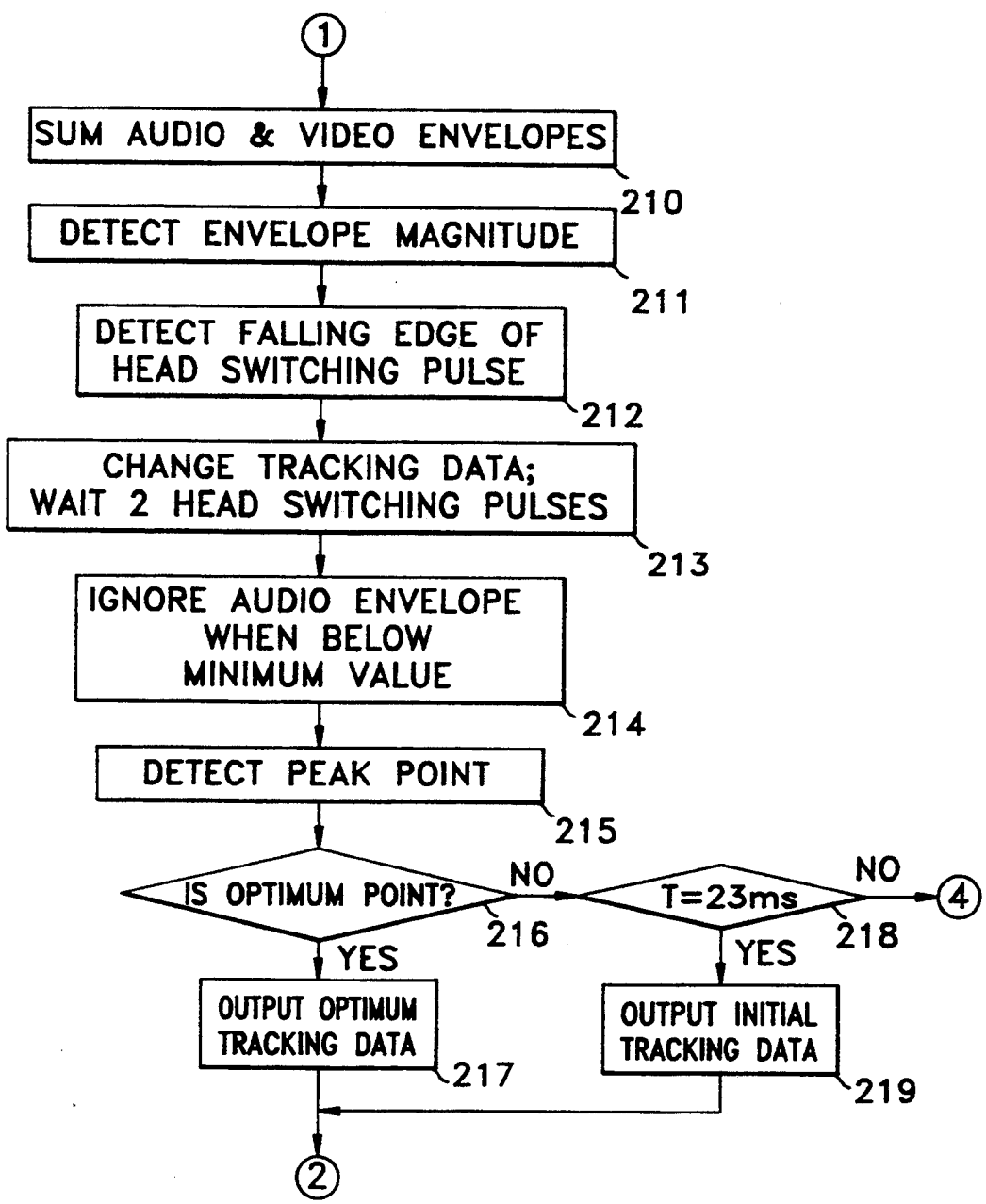

When it is confirmed in step 209 that respective sampling numbers of the audio envelope and video envelope are 30, the total audio envelope and video envelope is calculated in step 210 as shown in FIG. 3B. At this time, the envelope accumulating period corresponds to a section $T_3$ in FIG. 4D. After calculating the total envelope, step 211 is executed to detect the magnitude of the envelope. The magnitude of the envelope is determined using the total envelope. When $ENV_{t+1} - ENV_t \geq 20LSB$ and $ENV_{t+2} - ENV_{t+1} \geq 20LSB$, the envelope is regarded as large. On the other hand, when $ENV_{t+1} - ENV_t < 20LSB$ and $ENV_{t+2} - ENV_{t+1} < 20LSB$, the envelope is regarded as small. In these inequalities, $$LBS = V_{DD} \times \frac{1}{256},$$

and the time of envelope is changed in the order from $ENV_t$ to $ENV_{t+1}$ to $ENV_{t+2}$. If the foregoing inequalities are not satisfied, the envelope is determined to be flat. After detecting the magnitude of the envelope as described above, the falling edge of the head switching pulse is detected as shown in FIG. 4D, in step 212. After that, in step 213, the tracking data is changed in a period $T_4$ shown in FIG. 4D, and an envelope detection waiting state is maintained for two periods of the head switching pulse. Here, the operation for changing the tracking data is referred to as a tracking search where each tracking value is compared with the total envelope value of the sampled 30 points. After performing step 213, in step 214, the minimum value of the audio envelope is detected, and if it is found to be smaller than the value obtained by multiplying the total envelope value of the sampled 30 points by 0.5, only the video envelope is used and the audio envelope is ignored. Here, the requisite capacity of a RAM within the microcomputer may be too much if the sampling number is excessively large, so the sampling number is set to 30. In the foregoing description, steps 204 through 214 represent the tracking control step.

After step 214, the peak point of the total envelope waveform shown in FIGS. 5A and 5B is detected in step 215. At this time, the tracking is controlled for the video envelope prior to the control of audio envelope. First, referring to FIG. 5B, assuming that the search begins at point A, the initial value of the tracking data, and the total envelope value is detected at each of seven points as shown, the total envelope value shown in a plot G3 is detected such that the value increases to the second point, is constant over the next three points, and subsequently falls off for the last two points. Here, by considering the preceding and following margin among the points maintaining the same value, the search is completed at the point T1. Plot G3 shows a search conducted in the SP mode, a plot G4 is for the SLP mode.

In FIG. 5A, an automatic tracking is already carried out or the user manually adjusts at firsthand, not to begin the tracking at the initial state, so that the tracking value is set to a predetermined value. The search is completed at the point T2 where the detected envelope value is the same as that in FIG. 5B provided that the tracking data value at the point of change is B. A plot G1 is for the SP mode, and plot G2 is given as an example of the SLP mode.

After detecting the peak point in step 215, it is determined whether or not the detected point is the optimum point in step 216. If the detected point is the optimum point, the optimum tracking data is output in step 217. Meantime, if the detected point in step 215 is determined not to be the optimum point, the program proceeds to step 218, where it is determined whether or not a third predetermined time (about 23 ms) has elapsed. When the third predetermined time has not elapsed, the above-described operation is repeated by looping to step 207, to detect the optimum point by changing the tracking data until the third predetermined time elapses. If the result of the above decision steps 216 and 218 indicates that the optimum tracking point is not detected until the third predetermined time has elapsed, then the program proceeds to step 219 to output the tracking initial data. Steps 215 to 219 represent the process for detecting the optimum point.

Figure 3C:
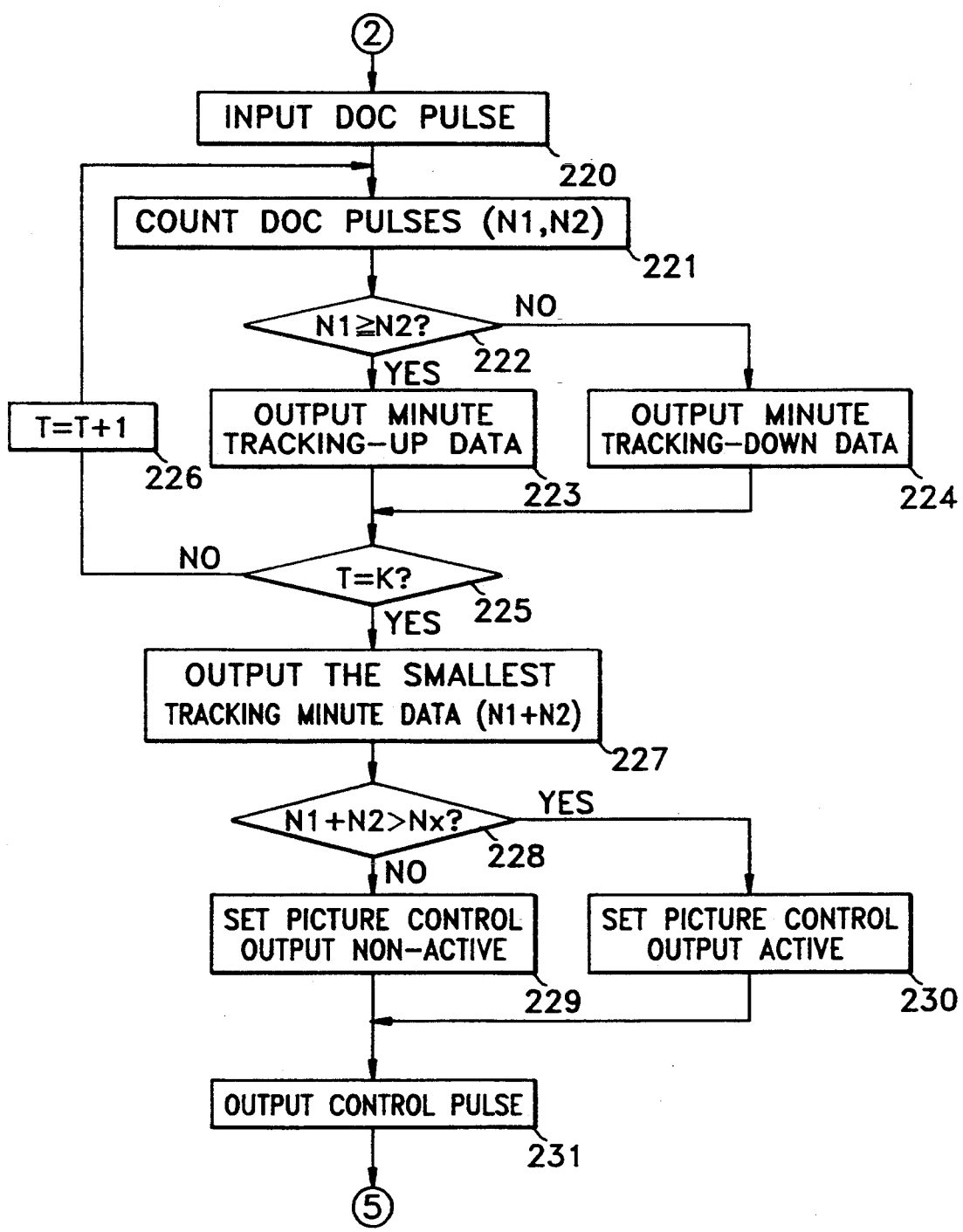

Referring to FIG. 3C, after executing step 219 or 217, a DOC pulse is input in step 220, and is counted during a first section S1 and a second section S2 in step 221, as illustrated in FIG. 4G. First and second sections S1 and S2 are each ½ period of the head switching pulse shown in FIG. 4A, which are for detecting the changes of the DOC pulse number according to the tracking. The counted DOC pulse number during first section S1 is designated a first pulse number N1, and that of section S2 is designated a second pulse number N2, which are correspondingly stored to a checking number T, and then, step 222 is performed. In step 222, the stored first pulse number N1 and second pulse number N2 are compared, and when first pulse number N1 equals or is greater than second pulse number N2, minute tracking-up data is output to servo circuit 20 in step 223. Otherwise, when first pulse number N1 is smaller than second pulse number N2, the minute tracking-down data is output to servo circuit 20 in step 224, and then step 225 is carried out. In step 225, the value of checking number T is checked as to whether or not it yet equals a set checking number K. If the checking number has not reached set checking number K, the value of checking number T is incremented by one in step 226, and then the aforesaid process is repeated by looping in step 221. That is to say, the respective numbers of DOC pulse generated in first and second sections S1 and S2 among the detected section are compared to minutely control the tracking, thereby making the number of first and second pulses N1 and N2 almost same. Also, by allowing a picture formed by a drop-out compensated video signal to position the upper and lower portions of the screen, noise due to time is decreased. When checking number T reaches set checking number K in step 225, i.e., when the minute controlling of the tracking is repeated as much as the set number, step 227 is performed. In step 227, the sum of first and second pulse numbers N1 and N2 which are stored by corresponding to each checking number T in step 221 are compared between each checking number T, and the corresponding tracking minute data is set to continuously output to servo circuit 20 when the compared value is minimum.

By the operation described above, the tracking is controlled to minimize the number of DOC pulses while maximizing the envelope level of the video signal. In step 228, the sum of first and second pulse numbers N1 and N2 corresponding to the minute tracking data fixed in step 227 is checked to determine whether or not the sum is smaller than a set value Nx. Then, if the sum is greater than the set value Nx, system control microcomputer 60 sets picture compensator control output A1 to be active in step 229, or to be inactive if the sum is smaller than set value Nx in step 230. After performing step 229 or step 230, a logic "high" picture compensator control signal is output to first and second compensators 30 and 40. At this time, when switch SW of first compensator 30 is reset, that is, when the picture compensator control signal of system control microcomputer 60 is logic "low", the varied voltage of power supply voltage Vcc by variable resistor VR1 is selected to be supplied as a gain control signal to input D0 of video processor 100.

According to this operation, the frequency characteristic gain of the video signal of video processor 100 is changed by the adjustment of variable resistor VR1, thereby controlling the sharpness of the picture. That is, the user turns a sharpness control knob, so that sharpness is controlled.

Under these circumstances, a logic "high" picture compensator control signal is applied from system control microcomputer 60 to switch SW, which switches switch SW to select power supply voltage Vcc divided by resistors R1 and R2 by a predetermined amount. The divided voltage is then supplied to input D0 of video processor 100 as a gain signal.

Therefore, after completing the tracking, the frequency characteristic gain is fixed to attenuate noise in the RF component when the generated DOC pulse exceeds set value Nx, so that the picture quality is compensated to retain constant sharpness.

At the same time, transistor Q1 of second picture compensator 40 is driven by the "high" picture quality compensator control signal, which effects the operation of resistors R5 and R6 and capacitor C1 constituting a noise cancel filter, thereby reducing the gain of a specific bandwidth of the video signal through input D1 of video processor 100. The specific bandwidth is the frequency bandwidth wherein noise is the most visually noticeable, which is 2.6 MHz±0.2 MHz.

Figure 3D:
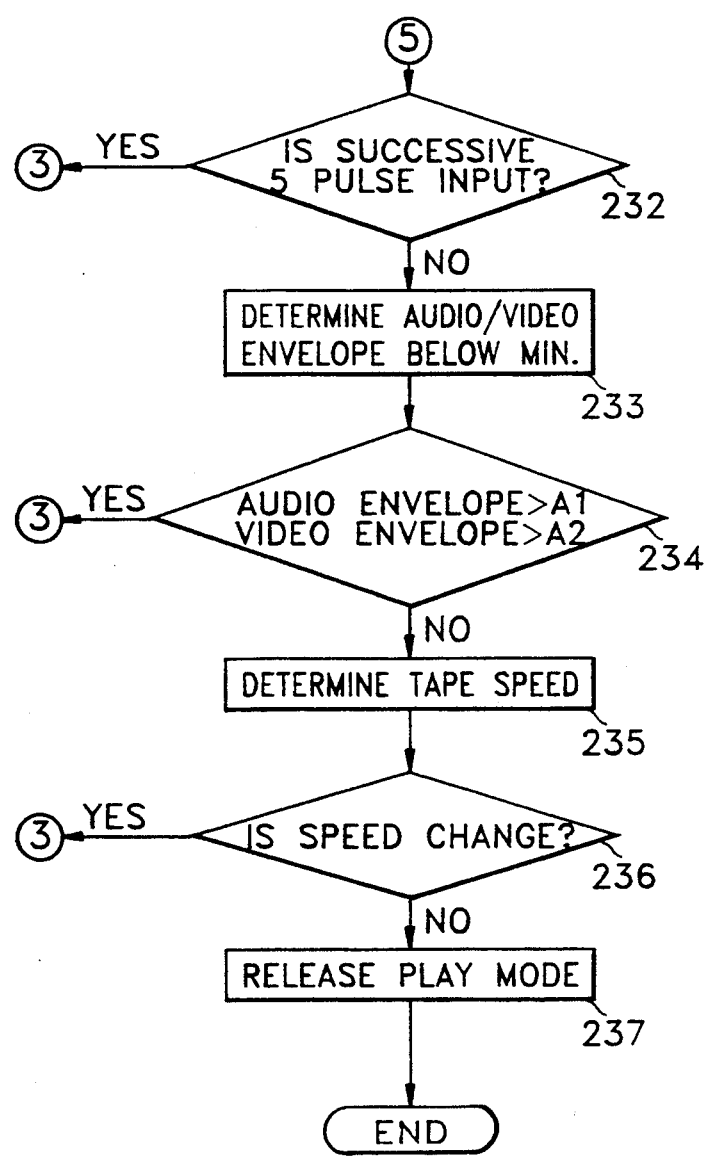

Referring to FIG. 3D, a mode for monitoring the tracking begins from step 232 in which the control pulse is determined whether or not it is successively input more than 5 times. When the control pulse is successively input more than 5 times in step 232, the program loops to step 205. When the control pulse is not successively input more than 5 times in step 232, the audio and video envelopes are determined whether or not they are below minimum (a predetermined voltage) in step 233. In step 234, when the audio envelope is greater than A1 and the video envelope is greater than A2, the program loops to step 205, and otherwise proceeds to step 235 to determine the speed of the tape. After step 235, change in the tape speed is determined in step 236. If the speed has changed, the program loops to step 205, and if not, it proceeds to step 237 to check the release of the play mode, so that the operation is finished when the release of the play mode is confirmed.

Therefore, in the present invention, the audio envelope, video envelope, and DOC pulse are detected to automatically control the tracking to be carried out in the optimum place, thereby maintaining optimum picture and audio qualities.

What is claimed is:

1. A circuit for automatically compensating tracking and picture quality in a video tape recorder, said circuit comprising:
   a microcomputer for controlling the video tape recorder by performing a program in response to a key input, for receiving a head switching pulse, a control pulse, a video envelope signal, an audio envelope signal, and a drop-out compensating pulse, and for generating tracking data controlling tracking and a picture quality compensating control signal controlling picture quality;
   a servo circuit for performing a servo function under the control of said microcomputer to execute tracking in accordance with said tracking data, and for supplying said head switching pulse and said control pulse to said microcomputer;
   a video processor for processing video signals during recording and playback, and for providing said drop-out compensating pulse;
   an audio processor for processing audio signals during the recording and playback, and for providing a maximum value of said audio envelope signal to said microcomputer;

a first picture compensator for supplying a gain signal to said video processor controlling a frequency characteristic gain of said video signals in accordance with said picture quality compensating control signal of said microcomputer;

a second picture compensator for operating in response to said picture quality compensating control signal of said microcomputer, for controlling attenuation of specific bandwidth noise of said video signals by controlling said video processor;

an envelope detector for detecting said video envelope signal from said video signals processed by said video processor, and for providing said video envelope signal to said microcomputer; and a drop-out compensating pulse buffer for buffering said drop-out compensating pulse provided by said video processor to said microcomputer.

2. A circuit for automatically compensating tracking and picture quality as claimed in claim 1, wherein said first picture compensator comprises:

a first resistor and a second resistor serially connected between a power supply terminal and a ground terminal for providing a divided voltage in response to a voltage of said power supply terminal;

a variable resistor for providing a variable voltage; and a switch switched by said picture quality compensating control signal of said microcomputer, for selectively providing one said divided voltage and said variable voltage to said video processor as said gain control signal.

3. A circuit for automatically compensating tracking and picture quality as claimed in claim 2, wherein said second picture compensator comprises:

a third resistor and a fourth resistor serially coupled to receive said picture quality compensating control signal;

a first transistor having a base electrode coupled between said third resistor and said fourth resistor; and a fifth resistor, a sixth resistor, and a first capacitor serving as a noise cancelling filter connected to said video processor, for attenuating said specific bandwidth noise in accordance with driving of said first transistor.

4. A circuit for automatically compensating tracking and picture quality as claimed in claim 3, wherein said envelope detector comprises:

a seventh resistor;

a second transistor serially connected with said seventh resistor, said second transistor receiving said video envelope signal of said video processor at a base of said second transistor via a buffering resistor to buffer said video envelope signal;

an eighth resistor;

a third transistor for receiving the buffered said video envelope signal from a collector of said second transistor at a base of said third transistor via said eighth resistor for amplification, and a fourth transistor having a base connected to an emitter of said third transistor through a third capacitor;

a first coil and a second capacitor serially connected between said base of said third transistor and the ground terminal;

a ninth resistor connected between the emitter of said third transistor and the ground terminal;

a tenth resistor and an eleventh resistor serially connected between the power supply terminal and the ground terminal, for providing a first divided voltage signal to the base of said fourth transistor;

a twelfth resistor and a second coil serially connected between the power supply terminal and a collector of said fourth transistor;

a fifth capacitor connected in parallel with said second coil;

a thirteenth resistor and a fourth capacitor connected in parallel between an emitter of said fourth transistor and the ground terminal;

a fourteenth resistor and a fifteenth resistor serially connected between the power supply terminal and the ground terminal for providing a second voltage signal;

a sixth capacitor;

a diode for inputting an amplified video envelope signal from said emitter of said fourth transistor received through said sixth capacitor via a common node between said fourteenth resistor and said fifteenth resistor; and a sixteenth resistor and a seventh capacitor connected in parallel between said diode and the ground terminal.

5. A circuit for automatically compensating tracking and picture quality in a video tape recorder, said circuit comprising:

a microcomputer for controlling said video tape recorder by performing a program in accordance with a key input;

a servo circuit for performing a servo function under control of said microcomputer;

a video processor for processing video signals during recordation and playback;

an audio processor for processing audio signals during the recordation and the playback, and providing a maximum value of an audio envelope signal to said microcomputer;

a first picture compensator for changing a frequency characteristic gain of said video signals in said video processor under the control of said microcomputer;

a second picture compensator for attenuating specific bandwidth noise of said video signals of said video processor under the control of said microcomputer;

an envelope detector for detecting a video envelope signal in response to said video signals from said video processor; and a drop-out compensating pulse buffer for buffering a drop-out compensating pulse from said video processor for providing a buffered drop-out compensating pulse to said microcomputer.

6. A method for automatically compensating tracking and picture quality in a video tape recorder, said method comprising:

controlling tracking by generating totals of samples of audio envelope signals and video envelope signals provided a predetermined number of times during a head switching pulse, and generating tracking data in response to said totals of said audio envelope signals and said video envelope signals;

detecting drop-out in a video signal reproduced by said video tape recorder;

counting drop-out compensating pulses, indicative of said drop-out detected in said video signal, during a predetermined period, minutely adjusting said tracking to minimize said drop-out compensating pulses during said predetermined period, and generating a picture quality control signal when the count of said drop-out compensating pulses exceeds a predetermined number; and repeating the tracking controlling step in response to said totals of said audio envelope signals and said video envelope signals exceeding a minimum value.

7. A method for automatically controlling coarse and fine tracking operations in a video tape recording device, said method comprising:
said coarse tracking operation comprising the steps of:
sampling envelope signals of detected video signals to generate successive sampling values,
summing said sampling values, in response to head switching pulses, for generating total envelope values, and
controlling said course tracking operation in response to said total envelope values generated for successive ones of said head switching pulses; and
said fine tracking operation comprising the steps of:
detecting drop-out in said detected video signals for generating drop-out compensation pulses, and
controlling said fine tracking operation in response to said drop-out compensation pulses.

8. A method as claimed in claim 7, wherein said coarse tracking operation further comprises the steps of detecting a peak one of said total envelope values, determining whether the detected peak envelope value is an optimum envelope value and repeating said coarse tracking operation if said peak envelope value is not said optimum envelope value.

9. A method as claimed in claim 7, said sampling step comprising the step of generating a predetermined number of said sampling values during the period between said successive ones of said head switching pulses.

10. A method as claimed in claim 9, said fine tracking operation comprising the steps of:
counting said drop-out compensation pulses during a first half of said period for deriving a first count and counting said drop-out compensation pulses during a second half of said period for deriving a second count;
comparing said first and second counts; and
controlling tracking in response to a result of said step of comparing said first and second counts.

11. A method as claimed in claim 10, said fine tracking operation further comprising the steps of summing said first count and said second count to generate a sum count value, comparing said sum count value to a predetermined count value and performing one of the steps of enabling and disabling a user operated picture sharpness control in response to a result of said step of comparing said sum count value to said predetermined count value.

12. A method as claimed in claim 11, said fine tracking operation further comprising the step reducing a gain of a bandwidth of said video for effecting noise cancellation in response to the result of said step of comparing said sum count value to said predetermined count value.

13. A circuit for automatically controlling tracking in a video tape recorder, said circuit comprising:

video processing means for processing video signals played back from a video tape, for generating video envelope signals in response to said video signals, for detecting drop-out of said video signals and for providing drop-out compensation pulses in response to each detected drop-out;

control means for sampling said envelope signals to generate successive sampling values, for generating total envelope values being summations of said sampling values for each head switching pulse period, and for generating coarse tracking data in response to said total envelope values;

said control means for generating fine tracking data in response to said drop-out compensation pulses; and servo means for controlling tracking of said video tape in response to said course tracking data and said fine tracking data, and for supplying head switching pulses to said control means.

14. A circuit as claimed in claim 13, further comprised of said control means for generating a comparison result by comparing first pulse counts of said drop-out compensation pulses generated during a first half period of said head switching pulse period with second pulse counts generated during a second half period of said head switching period, and for generating fine tracking data in response to said comparison result.

15. A circuit as claimed in claim 14, further comprised of:
first picture compensating means for providing first picture quality compensating signals to said video processing means to control a frequency characteristic gain of said video signals for controlling picture sharpness of said video signals in response to picture quality compensating control signals; and
said control means for generating a summation count value by summing said pulse counts during said first and second half periods of said head switching pulse period, for generating a comparison result by comparing the summation count value with a predetermined count value and for generating said picture quality compensating control signals for enabling or disabling user control of said first picture compensating means in response to said comparison result.

16. A circuit as claimed in claim 15, further comprised of:
second picture compensating means for generating second picture quality compensation signals for controlling attenuation of specific bandwidth noise of said video signals by said video processing means, said second picture compensating means generating said second picture quality compensation signals in response to said picture quality compensating control signals.

17. A circuit as claimed in claim 15, wherein said first picture compensating means comprises:
means for generating a reference voltage in response to a supply voltage;
means for generating a user controlled voltage; and
a switch, switched by said picture quality compensating control signals, for selectively providing one of said reference voltage and said user controlled voltage as said first picture quality compensating signals.

18. A circuit for automatically controlling tracking in a video tape recorder, said circuit comprising:
video processing means for processing video signals played back from a video tape, for generating video envelope signals in response to said video signals, for detecting drop-out in said video signals and for providing drop-out compensation pulses in response to the detected drop-out;

control means for generating coarse tracking data in response to said video envelope signals, for generating a comparison result by comparing pulse counts of said drop-out compensation pulses generated during first a half period of a head switching pulse period with pulse counts generated during a second half period of said head switching pulse period, and for generating fine tracking data in response to said comparison result;

servo means for controlling tracking of said video tape in response to said coarse tracking data and said fine tracking data, and for supplying head switching pulses to said control means.

19. A circuit as claimed in claim 17, further comprised of:

first picture compensating means for providing first picture quality compensating signals to said video processing means to control a frequency characteristic gain of said video signals for controlling picture sharpness of said video signals in response to picture quality compensating control signals; and said control means for generating a summation count value by summing said pulse counts during said first and second half periods of said head switching pulse period, for generating a comparison result by comparing the summation count value with a predetermined count value and for generating said picture quality compensating control signals for enabling or disabling user control of said first picture compensating means in response to said comparison result.

20. A circuit as claimed in claim 19, wherein said first picture compensating means comprises:

means for generating a reference voltage in response to a supply voltage;

means for generating a user controlled voltage; and a switch, switched by said picture quality compensating control signals, for selectively providing one of said reference voltage and said user controlled voltage as said first picture quality compensating signals.

21. A circuit as claimed in claim 19, further comprised of second picture compensating means for generating second picture quality compensation signals for controlling attenuation of specific bandwidth noise of said video signals by said video processing means, said second picture compensating means generating said second picture quality compensation signals in response to said picture quality compensating control signals.

22. A circuit as claimed in claim 21, wherein said second picture compensating means comprises:

a transistor receiving said picture quality compensating control signals being voltage divided by a first resistor and a second resistor at a base of said transistor; and a third resistor, a fourth resistor and a capacitor serving as a noise cancelling filter connected to said video processing means, for attenuating said specific bandwidth noise in accordance with driving of said transistor.

23. A method for automatically controlling tracking in a video tape recording device, said method comprising:

a coarse tracking operation for controlling tracking in response to video envelope signals of detected video signals and in response to audio envelope signals of detected audio signals, said video and audio signals being generated by playback of a tape in said video tape recording device; and a fine tracking operation for precisely controlling tracking in response to drop-out compensation pulses generated in response to drop-outs detected in the video signals played back by said video tape recording device, by performing a comparison of first pulse counts of the drop-out compensation pulses generated during a first half period of a head switching pulse period with second pulse counts of the drop-out compensation pulses generated during a second half period of said head switching pulse period, and controlling tracking in response to results of said comparison.

* * * * *

UNITED STATES PATENT AND TRADEMARK OFFICE
CERTIFICATE OF CORRECTION

PATENT NO. : 5,384,642
DATED : Jan. 24, 1995
INVENTOR(S) : Sun-seon Sim

It is certified that error appears in the above-indentified patent and that said Letters Patent is hereby corrected as shown below:

On the title page, item [54] and col. 1.

Title      Correct the Title to read --CIRCUIT AND METHOD FOR AUTOMATICALLY COMPENSATING TRACKING AND PICTURE QUALITY IN A VTR--:

Column 3,    Line 20,    after "through", change "4B" to --4G--;

Column 4,    Line 28,    after "resistor", change "RS" to --R8--;

Line 49,    rewrite the sentence "composed of a transistor Q5 driven by inputting the DOC pulse buffer 70 is; DOC pulse from video processor 100, which is divided by resistors R17 and R18." to --DOC pulse buffer 70 is composed of a transistor Q5 driven by inputting the DOC pulse from video processor 100, which is divided by resistors R17 and R18.--

UNITED STATES PATENT AND TRADEMARK OFFICE
CERTIFICATE OF CORRECTION

PATENT NO. : 5,384,642
DATED : Jan. 24, 1995
INVENTOR(S) : Sun-seon Sim

It is certified that error appears in the above-indentified patent and that said Letters Patent is hereby corrected as shown below:

Column 5,    Line 29,    before "is", delete "which":

IN THE CLAIM

Claim 19,    Line 18,    after "claim", change "17" to --18--:

Signed and Sealed this

Twentieth Day of May, 1997

*Attest:*

BRUCE LEHMAN

*Attesting Officer*    *Commissioner of Patents and Trademarks*